(12) United States Patent
Ng

(10) Patent No.: US 7,888,914 B2
(45) Date of Patent: Feb. 15, 2011

(54) BATTERY REJUVENATION METHOD AND APPARATUS

(76) Inventor: Man Oi Cleo Ng, Flat B, 3/F., Tak Wing Industrial Building, 3 Tsun Wen Road, Tuen Mun, N.T. (HK)

( * ) Notice: Subject to any disclaimer, the term of this patent is extended or adjusted under 35 U.S.C. 154(b) by 492 days.

(21) Appl. No.: 12/125,819

(22) Filed: May 22, 2008

(65) Prior Publication Data
US 2009/0289602 A1    Nov. 26, 2009

(51) Int. Cl.
*H02J 7/00* (2006.01)
*H02J 7/04* (2006.01)
(52) U.S. Cl. ................... 320/139; 320/128; 320/133
(58) Field of Classification Search ............ 320/139
See application file for complete search history.

(56) References Cited
U.S. PATENT DOCUMENTS
5,498,950 A * 3/1996 Ouwerkerk ............. 320/119
5,818,202 A * 10/1998 Miyamoto et al. ......... 320/125
5,850,136 A * 12/1998 Kaneko ................... 320/119
6,225,786 B1 * 5/2001 Muramatsu et al. ....... 320/150

* cited by examiner

*Primary Examiner*—Edward Tso
*Assistant Examiner*—M'Baye Diao
(74) *Attorney, Agent, or Firm*—J.C. Patents

(57) ABSTRACT

The present invention provides a battery rejuvenation method for rejuvenating a battery, which firstly pre-charges the battery for a short period of time and judges the battery condition by comparing the battery voltage to a preset reference voltage value, and then alternately performs an equalizing mode operation and a reconditioning operation to rejuvenate the battery until the battery voltage is not higher than the reference voltage value. The operations in equalizing mode and reconditioning mode could enhance the rejuvenating results by each other, which is not only dissolve the lead sulphate crystal, but also bring the electrolyte fluid to a well-distributed and fully-restored state. The present invention also provides a battery rejuvenation apparatus for rejuvenating a battery.

16 Claims, 3 Drawing Sheets

BATTERY REJUVENATION METHOD AND APPARATUS

FIELD OF THE INVENTION

The present invention relates to the field of a battery rejuvenation method and apparatus, and more particularly, to a method and apparatus for rejuvenating lead acid batteries.

BACKGROUND OF THE INVENTION

During discharging process of a lead acid battery, lead sulphate will form in electrolyte fluid of the battery. While during recharging process, the lead sulphate will be restored to lead and sulfuric acid. If the lead acid battery is always under the conditions of under-charging or over-discharging, lead sulphate deposition will crystallize and build up on electrical plates inside the battery. If the lead sulphate deposition is not dissolved for a long time, the deposition will accumulate on the electrical plates and form solid insulating points or layers thereon, which may affect the chemical reactions of active materials of the electrical plates, such as, lead, oxidized lead and so on. In addition, the lead sulphate would be not well-distributed in the electrolyte fluid during the course of charging or discharging of the battery, or as certain active materials in the electrolyte fluid will absorb the lead sulphate, the solubility of the lead sulphate will be reduced. Furthermore, with respect to a lead acid battery consisted of several internal cells connected in series, the internal cells may not be in equalizing state, and a weak or poor-conditioned cell among the internal cells will generate its own voltage level and will further deteriorate the condition of the battery.

If one or more of the above situations occur, the internal impedance of the lead acid battery will increase, the capacity of the battery will decrease or even lose, and the life thereof will be shortened.

Many methods and apparatuses proposed to de-sulphate lead acid batteries by applying charging pulses of different kinds thereon. However, it has been found that those methods and apparatuses were not always successful in rejuvenating weak lead acid batteries which are under the above-mentioned situations. The inventor of the present invention proposed a novel method and apparatus for rejuvenating a sulphated or weak lead acid battery by alternating two kinds of operations, which could not only dissolve the lead sulphate deposition on the electrical plates of the battery, but also bring the electrolyte fluid to a well-distributed and fully-restored state. In addition, the method and apparatus of the present invention could also efficiently equalize individual internal cells of the battery.

SUMMERY OF THE INVENTION

The present invention provides a battery rejuvenation method for rejuvenating a battery, which may comprises the following steps: (a) pre-charging the battery for a short period of time; (b) detecting the battery voltage and judging whether the battery voltage is higher than a reference voltage value; (c) equalizing the battery with an equalizing voltage based on an equalizing current for a first period of time if it determines that the battery voltage is higher than the reference voltage value in the step (b); (d) reconditioning the battery with a high instantaneous rising pulse current of high peak to peak amplitude and short pulse rising time for a second period of time; (e) equalizing the battery with the equalizing voltage based on the equalizing current, detecting the battery voltage and judging whether the battery voltage is higher than a reference voltage value; (f) maintaining the step (e) for a total period of time equal to the first period of time and then repeat the step (d) if it determines that the battery voltage is higher than the reference voltage value during the step (e), or stopping the step (e) immediately and proceeding to the next step whenever it determines that the battery voltage is not higher than the reference voltage value in step (e); (g) reconditioning the battery with the high instantaneous rising pulse current for a third period of time.

Alternatively, the step (c) of the present method may be equalizing the battery with an equalizing voltage based on an equalizing current for a first period of time and then proceeding to the step (g) directly if it determines that the battery voltage is not higher than the reference voltage value in the step (b).

The present method may further comprise the step of detecting the temperature of the battery and judging whether the temperature is higher than a reference temperature value during the course of equalizing the battery. If it determines that the temperature of the battery is higher than the reference temperature value, the procedure enter the step (g) immediately Preferably, the equalizing voltage and the equalizing current may be intermittently applied on the battery, which could avoid damage to the battery.

Preferably, the peak to peak amplitude of the instantaneous rising pulse current may be 8.0 A and the pulse rising time may be 10 μs.

Preferably, the short period of time is 5 minutes, the first and second period of time are 2 hours respectively, while the third period of time is 10-72 hours or more. The total period of time for the whole procedure of the present method may be set as 168 hours or more.

In another aspect, the present invention further provides a battery rejuvenation apparatus for rejuvenating a battery, which may comprise: a pulse width modification controller which is used to generate a first pulse train signal and is connected to a first switching module to control the operation of the first switching module with the first pulse train signal; a transformer having a primary winding and a secondary winding, in which the primary winding is connected to a main power source and to the ground through the first switching module; a rectifier-filter module connected to the secondary winding of the transformer; a first and second terminals connected to positive and negative terminals of the battery respectively, in which the second terminal is connected directly to the rectifier-filter module; a second switching module connecting the rectifier-filter module to the first terminal; a third switching module connected in parallel with the second switching module for connecting the rectifier-filter module to the first terminal; a microcontroller unit for turning on the second switching module and the third switching module alternatively, in which when the second switching module is turned on, the rectifier-filter module charges or equalizes the battery, and when the third switching module is turned on, the rectifier-filter module reconditions the battery with a high instantaneous rising pulse current of high peak to peak amplitude and short pulse rising time.

Preferably, the first switching module is a MOSFET having a gate, a drain and a source, in which the gate of the MOSFET is connected to the pulse width modification controller to receive the first pulse train signal, while the drain and the source thereof are connected to the primary winding of the transformer and the ground respectively.

Preferably, the second switching module comprises a relay coil, a normally open relay switch, a relay coil power source and a first transistor having a base, a collector and an emitter, in which the relay coil is connected to the relay coil power source and to the collector of the first transistor, the base and the emitter of the first transistor are connected to the microcontroller unit and the ground respectively, the normally open relay switch is connected between the rectifier-filter module and the first terminal, and the second switching module is turned on when the microcontroller unit sends a signal of high level to the base of the first transistor.

In addition, he battery rejuvenation apparatus may further comprise a feedback module for sending a feedback signal to the pulse width modification controller to enable the pulse width modification controller to modify the working time in the first pulse train signal.

Preferably, the feedback module may comprise a photocoupler having a light emitting diode and an optical receiver transistor; and a second transistor having a base, a collector and an emitter, in which the base of the second transistor is connected to the microcontroller unit for receiving a signal from the microcontroller unit during the operation of the second switching module, and the emitter of the second transistor is connected to the ground, and the collector of the second transistor is connected to the cathode of light emitting diode the anode of which is connected to the output end of the rectifier-filter module, and the light receiver transistor having an emitter connected to the ground and a collector connected to the pulse width modification controller for inputting the feedback signal thereto. The feedback module may further comprise a zener diode connected in parallel with the second transistor.

Preferably, the third switching module may comprise third and fourth transistors, a diode, and first, second and third resistors, in which the third transistor comprises an emitter connected to the rectifier-filter module, a collector connected to the first terminal through the diode, and a base connected through the first resistor to the rectifier-filter module and through the second resistor, the fourth transistor and the third resistor to the microcontroller unit, the fourth transistor comprises an emitter connected to the ground, a collector connected to the second resistor and a base connected to the microcontroller unit through the third resistor to received a second pulse train signal from the microcontroller unit.

In addition, the battery rejuvenation apparatus may further comprise a detecting circuit for detecting the voltage of the battery and a temperature detector for detecting the temperature of the battery.

As mentioned above, the apparatus and method of the present invention could not only dissolve the lead sulphate deposition on the electrical plates of the battery, but also bring the electrolyte fluid to a well-distributed and fully-restored state. In addition, the method and apparatus of the present invention could also efficiently equalize individual internal cells of the battery.

BRIEF DESCRIPTION OF THE DRAWINGS

The above aspects and features of the present invention will be more apparent by describing certain exemplary embodiments of the present invention with reference to the accompanying drawings, in which.

DETAILED DESCRIPTION OF THE INVENTION

With reference to the accompanied figures, the embodiments of the present invention will be described in detail as follows.

Figure 1:
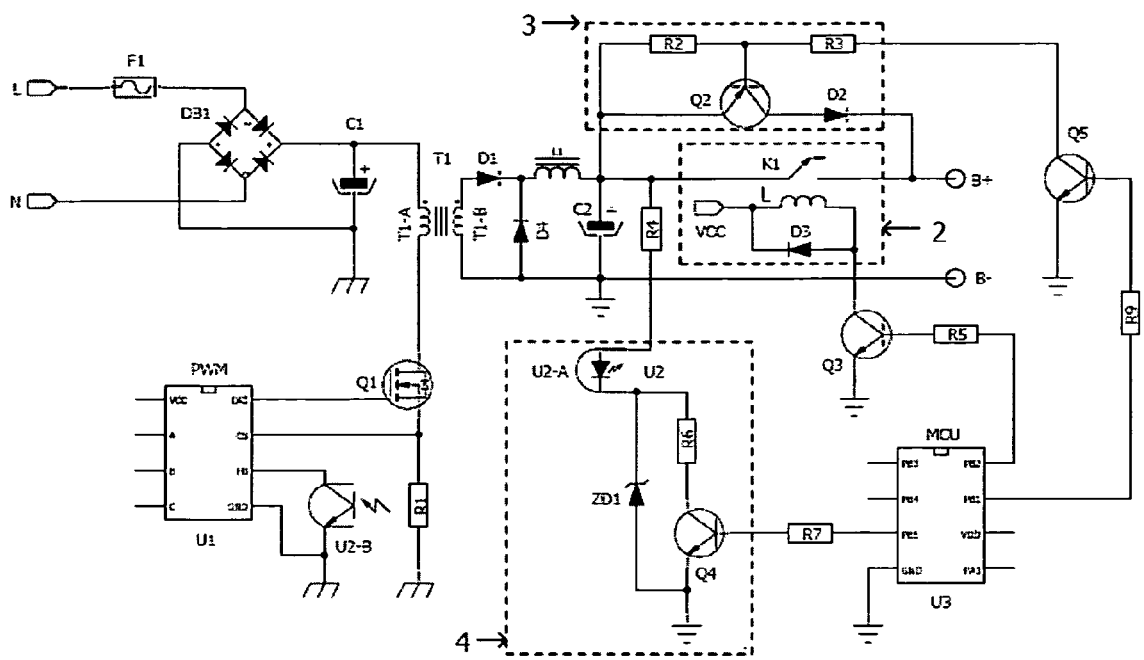
FIG. 1 is a circuit schematic for the battery rejuvenation apparatus of the present invention.

As shown in FIG. 1, the battery rejuvenation apparatus of the present invention may be powered by a main power source, such as a local AC power source, which is connected to a transformer T1 through a bridge rectifier DB1 which bridge rectifier is used convert the alternating current from the main power source into a train of direct current pulses. The transformer T1 may comprise a primary winding T1-A which is connected to the bridge rectifier DB1 and to the ground through a first switching module Q1, and a secondary winding T1-B which are connected to the other part of the battery rejuvenation apparatus.

The present battery rejuvenation apparatus also comprises a pulse width modulation (PWM) controller U1 which is used to generate a pulse train signal. The PWM controller U1 could be powered by the main power source, or a separate power source (not shown in the figures).

In FIG. 1, the first switching module Q1 is shown as a MOSFET, whose gate is connected to the output pin of the PWM controller U1 to receive the pulse train signal, while the drain and the source thereof are connected to the primary winding of the transformer T1 and the ground respectively through a current limiting resistor. When the signal in the pulse train signal generated by the PWM controller U1 is high, the MOSFET Q1 is turned on, and then the main power source, the transformer T1 and the MOSFET Q1 form a loop circuit, thus, the transformer T1 starts to receive and transfer the voltage from the primary winding to the secondary winding. On the other hand, when the signal in the pulse train signal is low, the MOSFET Q1 is cut off, thus, the transformer T1 does not work. To stabilize the voltage applied to the transformer T1 by the main power source, a capacitor C1 could be connected in parallel with the transformer T1 and the MOSFET Q1. Alternatively, the first switching module could also be a transistor or IGBT etc.

The secondary winding T1-B of the transformer T1 is connected to a rectifier-filter module comprising rectifier diodes D1 and D4, an inductor L1 and a filter capacitor C2. In particular, the top of the secondary winding T1-B of the transformer T1 is connected to the anode of the rectifier diode D1 the cathode of which is connected through the inductor L1, a second switching module 2 and a third switching module 3 to a positive terminal B+, which positive terminal B+ is subject to be connected with the positive electrode of the battery to be rejuvenated, in which the second and third switching modules are connected in parallel between the inductor L1 and the positive terminal B+. The bottom of the secondary winding T1-B is connected directly to a negative terminal B−, which negative terminal B− is subject to be connected with the negative electrode of the battery. The diode D4 is connected between the cathode of the rectifier diode D1 and the bottom of the secondary winding T1-B, while the filter capacitor C2 is connected between the output end of the inductor L1 and the bottom of the secondary winding T1-B.

The second switching module 2 comprises a relay coil L, a normally open relay switch K1, a relay coil power source VCC and a transistor Q3. The relay coil L is connected to the relay coil power source VCC and further connected through the transistor Q3 and a resistor R5 to a microcontroller unit (MCU) U3. The relay coil L is connected to the collector of the transistor Q3, while the base of the transistor Q3 is connected through the resistor R5 to the MCU U3, and the emitter thereof is connected to the ground. The normally open relay switch K1 is connected between the inductor L1 and the positive terminal B+. To protect the relay coil L from being damaged, the second switching module 2 may further comprises a diode D3 connected in parallel with the relay coil L, in which the anode of the diode D3 is connected to the collector of the transistor Q3 while the cathode thereof is connected to the relay coil power source VCC. The relay power source VCC could be the main power source or a separate power source.

The third switching module 3 comprises transistors Q2 and Q5, a diode D2, and resistors R2 and R3. As shown in FIG. 1, the transistor Q2 is a PNP type transistor the emitter of which is connected to the inductor L1, while the collector thereof is connected through the diode D2 to the positive terminal B+. The base of the transistor Q2 is connected through the resistor R2 to the inductor L1 and is also connected through the resistor R3, the transistor Q5, and a resistor R9 to the MCU U3.

In addition, the present battery rejuvenation apparatus may further comprise a feedback module 4, which comprises a photo-coupler U2, a resistor R6, a transistor Q4 and a zener diode ZD1. The photo-coupler U2 comprises a light emitting diode (LED) U2-A as an optical emitter and a transistor U2-B as an optical receiver. The resistor R6 is connected to the collector of the transistor Q4 whose emitter is connected to the ground and base is connected through a resistor R7 to the MCU U3. And then, the resistor R6 and transistor Q4 are connected in parallel with the zener diode ZD1 to the cathode of the LED U2-A the anode of which is connected through a resistor R4 to the output end of inductor L1. The emitter of the transistor U2-B of the photo-coupler U2 is connected to the ground and the collector thereof is connected to the voltage feedback pin of the PWM controller U1, to input the feedback signal to the later.

The MCU U3 of the present battery rejuvenation apparatus is used to control the operation of the second and third switching modules 2 and 3, as well as the operation of the feedback module 4.

When the second switching module 2 needs to be switched on, the MCU U3 inputs a signal of high level to the base of the transistor Q3 of the second switching module 2 to turns on the transistor Q3, then the relay coil power source VCC, the relay coil L1 and the transistor Q3 form a loop circuit. When the relay coil L is supplied energy by the power source VCC, it makes relay switch K1 to be closed. Thus, the energy stored in the capacitor C2 and the inductor L1 is applied through the relay switch K1 to the battery. On the contrary, when the MCU U3 input a signal of low lever to the transistor Q3, the relay switch K1 will be opened, and in turned, the second switching module 2 would be switched off.

When the feedback module 4 is to be operated, the MCU U3 will apply a pulse train signal with a predetermined frequency to the base of the transistor Q4 of the feedback module 4. When the signal applied on the transistor Q4 is in high level, the transistor Q4 is turned on, and in turn the LED U2-A of the photo-coupler U2 starts to emit light, which will turn on the transistor U2-B of the photo-coupler U2. Therefore, the transistor U2-B inputs a feedback signal to the PWM controller U1, and then the working time of the signals output from the PWM controller U1 will be adjusted, which in turn change the energy transferred from the primary winding T1-A of the transformer T1 to the secondary winding T1-B thereof. However, when the signal applied on the transistor Q4 is in low level, the LED U2-A will not work, and then the photo-coupler U2 will stop inputting feedback signal to the PWM controller U1.

To operate the third switching module 3, the MCU U3 first stops sending signals of high level to the base of transistors Q3, thus, the transistors Q3 and in turn the second switching module 2 are switched off. Then, the MCU U3 will send a pulse train signal with a predetermined frequency to control the transistors Q5 and Q2 of the third switching module 3. When the signal applied on the transistor Q5 is in high level, the transistor Q5 will be turned on, and then the transistor Q2 and in turn the third switching module 3 are turned on. Therefore, the energy stored in the inductor L1 and the capacitor C2 will be applied to the battery. At the same time, the MCU U3 applies a pulse train signal to the transistor Q4 of feedback module 4, then the working time of the signals output from the PWM controller U1 will be adjusted by means of the MCU U3. Thus, the energy stored in the inductor L1 and the capacitor C2 will be released in form of an instantaneous rising pulse current. In addition, because of the zener diode ZD1, the voltage at the back of the inductor L1 and the capacitor C2 is held at about the zener voltage of the zener diode ZD1. While the signal applied on the transistor Q5 is in low level, the transistors Q5 and Q2 will be switched off, and then the third switching module 3 are switched off accordingly. Therefore, the energy stored in the inductor L1 and the capacitor C2 will not be applied to the battery.

As mentioned above, the MCU U3 could control the operation of the second and third switching module 2 and 3 through a resistor R4, and the feedback module 4. However, if the MCU U3 only controls the second switching module 2 and the feedback module 4 to work, while keeps the third switching module 3 from working, the present rejuvenation apparatus could operate as a battery charger. Meanwhile, the control of the MCU U3 on the feedback module 4, the working time of the signals output from the PWM controller U1 could be adjusted, thus, the mode of energy applied on the battery to be charged could be adjusted accordingly. Therefore, the battery could be charged, for example, at a constant voltage, a constant current, a float charge voltage, or any other modes known in this field.

As an example, the typical specifications of the components in FIG. 1 are as follows:

| | |
|---|---|
| Resistor R1 | 0.3 Ω |
| Resistor R2, | 4.7K |
| Resistor R3, R4 | 1.0K |
| Resistor R5, R7 and R9 | 2.2K |
| PWM controller U1 | UC3844/5 |
| Photo-coupler U2 | EL817 |
| MCU U3 | ATMEGA88 |
| Transformer T1 | EE4215 |
| Capacitor C1 | 220 µf/200 V |
| Capacitor C2 | 2200 µf/35 V |
| Diode D1, D4 | MBR2060 |
| Diode D2 | 1N4937 |

-continued

| Diode D3 | IN4148 |
| Zener diode ZD1 | 20 V |
| MOSFET Q1 | W14NK50Z |
| Transistor Q2 | TIP42C PNP type transistor |
| Transistor Q3, Q4, Q5 | 2N5551 NPN type transistor |
| Inductor L1 | 75uH |
| Fuse F1 | T4A/250 V |
| Bridge rectifier DB1 | 6A4 |
| Relay switch K1 | RWH-SH-112 |

Figure 2:
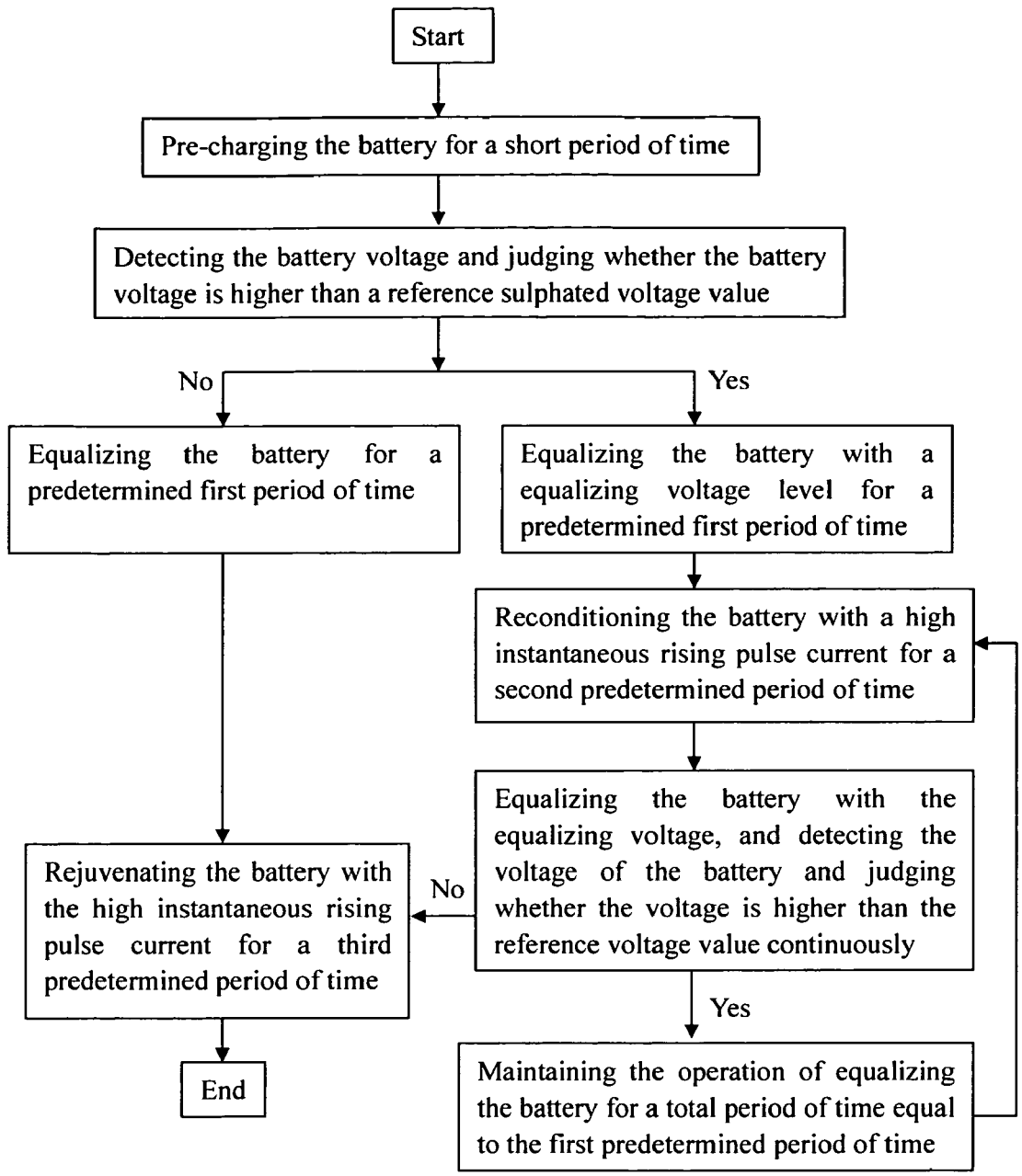
FIG. 2 illustrates a flow chart of the battery rejuvenation method according to the present invention.

With reference to FIG. 2, the methods for rejuvenating a battery by means of the battery rejuvenation apparatus as shown in FIG. 1 will be described in detail.

After a battery to be rejuvenated, for example with normal potential of 12.0 volts, is connected between the positive and negative terminals B+ and B− of the present apparatus, the main power source is turned on. Then, the PWM controller U1 starts to generate a pulse train signal, which will turn on or cut off the MOSFET Q1 in a manner as mentioned above. With the alternation of the state of the MOSFET Q1, the transformer T1 operates intermittently, to transfer the voltage of the main power source to the secondary winding T1-B thereof. Then, the input energy will be stored in the inductor L1 and the capacitor C2.

At the same time, the MCU U3 will detect the presence of the battery with a detection circuit (not shown in the figures), which may be any kind of detection circuit known to the skilled in this art. If the MCU U3 determines that the battery is connected to the present apparatus, it will send a signal of high level to the base of the transistor Q3 of the second switching module 2, thus, the normally open relay switch K1 is closed. Therefore, the energy stored in the inductor L1 and the capacitor C2 could be applied to the battery via the relay switch K1, i.e. via the second switching module 2.

With the relay switch K1 being closed, the battery may be first pre-charged for a short period of time, for example, for about 3-5 minutes, as shown in FIG. 2. Then, the MCU U3 detects the voltage of the battery by mean of the detection circuit and judges whether the voltage of the battery is higher than a predetermined battery sulphated reference voltage value, for example, 16.0 volts.

Figure 3:
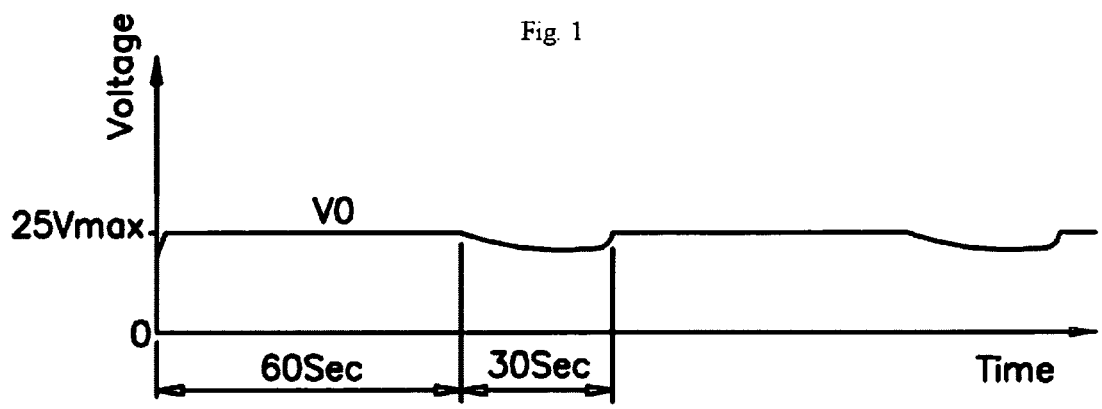
FIG. 3 is a schematic view illustrating the waveform of the average voltage applied on the battery in equalizing mode of the present battery rejuvenation method.
Figure 4:
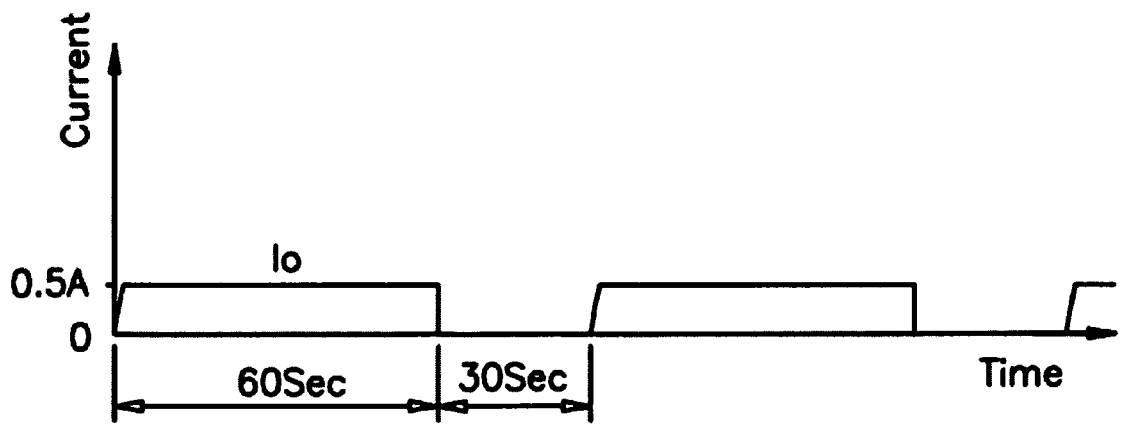
FIG. 4 is a schematic view illustrating the waveform of an average current applied on the battery in equalizing mode of the present battery rejuvenation method.

If the battery voltage is higher than the battery sulphated reference voltage value, the MCU U3 determines that the battery has high internal impedance and needs to be rejuvenated. Thus, the MCU U3 will control the present apparatus to operate in an equalizing mode for a predetermined first period of time, for example, 2 hours, which could equalize the state of the battery. In the equalizing mode, the rectifier-filter module could apply a small equalizing current and a high equalizing voltage to the battery. For example, as shown in FIGS. 3 and 4, the average equalizing current $I_0$ may be about 200-500 milliamps, and the average equalizing voltage $V_0$ may be up to 18~25V. That is, the equalizing current and the equalizing voltage are applied on the battery intermittently.

To obtain the above equalizing current and voltage, the present apparatus will operate in the following manner. The PWM controller U1 outputs a pulse train signal with a certain frequency and duty cycle, for example, 65 KHz and 0.4. As mentioned above, the working time of the signal output from the PWM controller U1 could be controlled by the MCU U3 via the feedback module 4. For example, the MCU U3 applies a signal with frequency of 62.5 Hz (16 ms duration) on the base of the transistor Q4. Firstly, the MCU U3 outputs to the signal with working time of 0.8 ms in the 16 ms duration which will lasts for 60 seconds, and then outputs the signal with working time of 0.15 ms in the 16 ms duration which will lasts for 30 seconds. During the signal with working time of 0.8 ms, the working time of the signal input to the first switching module Q1 from the PWM controller U1 will be adjusted. Thus, the operation of the transformer T1 could be controlled accordingly, to apply the charging current of about 500 mA on the battery. However, during the signal of MCU U3 with working time of 0.15 ms, the transformer could only deliver the unload voltage to maintain the operation of the present apparatus.

Generally, the operation of the present apparatus in the equalizing mode may preheat the electrolyte fluid of the battery to a proper temperature, preheat the lead sulphate on the electrical plates to a proper temperature, speed up the chemical restoration of the lead sulphate, make the lead sulphate crystals in the electrolyte fluid to be equally distributed. Meanwhile, as the average equalizing voltage applied on the battery is about 18~25V, the states of the individual cells inside the battery are equalized. On the other hand, as the battery is charged in the equalizing mode, in which the charging operation alternatively lasts for 60 seconds and stops for 30 seconds, it could avoid over-heating and damaging the battery.

Next, the MCU U3 will control the present apparatus to operate in a reconditioning mode for a predetermined second period of time, for example, 2 hours, which could recondition the battery step by step. In the reconditioning mode, the rectifier-filter module could apply a high instantaneous rising pulse current to the battery.

Figure 5:
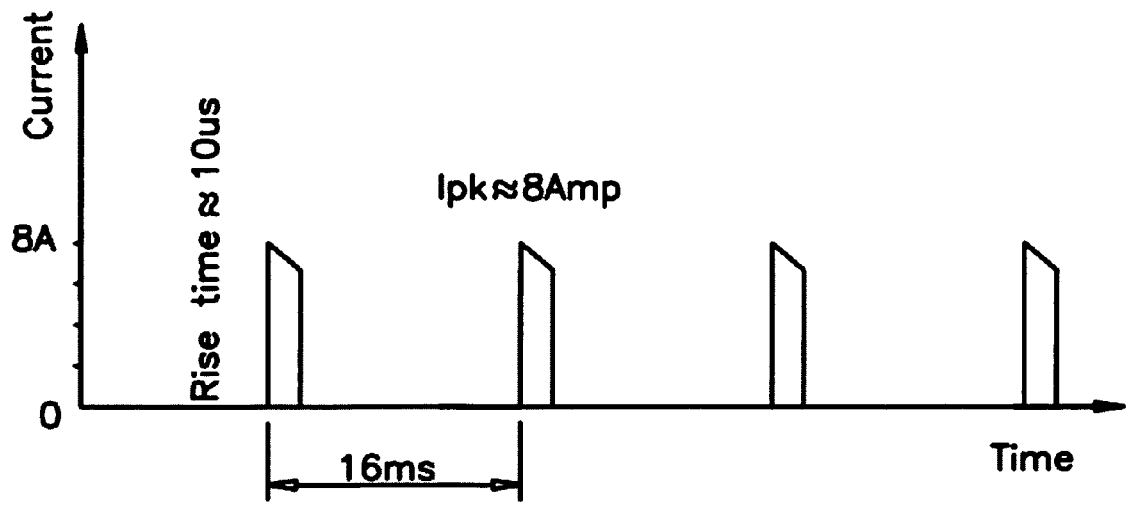
FIG. 5 is a schematic view illustrating the waveform of a current applied on the battery in reconditioning mode of the present battery rejuvenation method.

At first, the MCU U3 stops sending signals of high level to the base of transistors Q3, thus, the transistors Q3 and in turn the second switching module 2 are switched off. Then, the MCU U3 sends a pulse train signal with a certain frequency, such as 62.5 HZ to control the transistors Q5 and Q2 of the third switching module 3. At the same time, the MCU U3 still applies a pulse train signal with a frequency of 62.5 Hz (16 ms duration in one cycle) to the transistor Q4 of feedback module 4, however, the working time of the signal input to the transistor Q4 may be 250 μs in one 16 ms duration. Meanwhile, because of the zener voltage of the zener diode ZD1, for example 20 volts, thus, the voltage at the back of the inductor L1 and the capacitor C2 could be held at a voltage level of 22V. Therefore, when the transistors Q2 and Q5 in the third switching module 3 are turned on, the inductor L1 and the capacitor C2 will release the energy stored therein in form of the high instantaneous rising pulse current whose peak to peak amplitude can reach about 8.0±3 A and pulse rising time is about 10 μs. The waveform of the high instantaneous rising pulse current is shown in FIG. 5.

After that, the MCU U3 controls the present apparatus to repeat the above-mentioned equalizing mode operation, and at the same time, the MCU U3 detects the voltage of the battery and judge whether the battery voltage is higher than the reference voltage value continuously.

Figure 6:
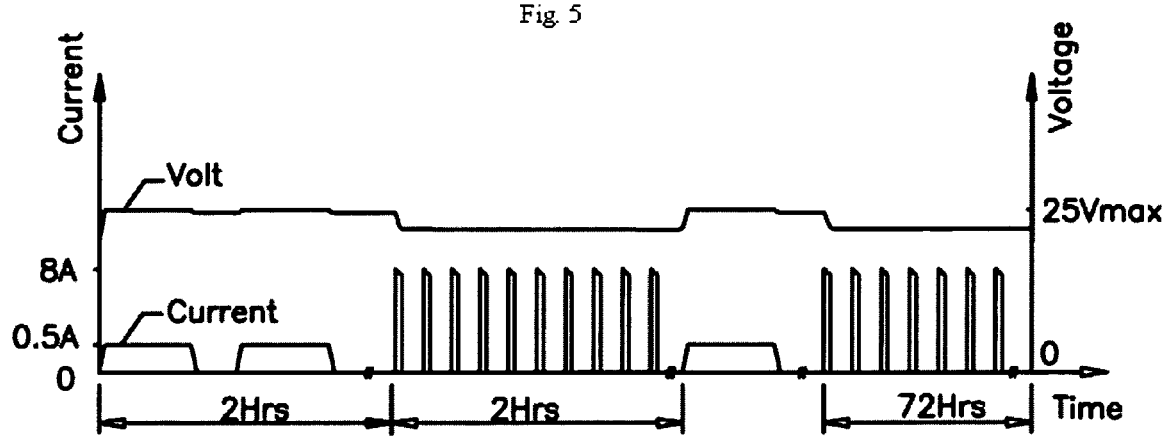
FIG. 6 is a schematic view illustrating the waveform for alternating the equalizing mode and the reconditioning mode, in which the battery is in a poor condition.

The repeated equalizing mode operation of the present apparatus will be maintained for a total period of time equal to the above-mentioned first period of time if the MCU U3 determines that the battery voltage is higher than the reference voltage value. Then, the MCU U3 controls the present apparatus to repeat the above-mentioned reconditioning mode operation for the above second period of time. After that, the MCU U3 once again controls the present apparatus to repeat the equalizing mode operation for the first period of time, and then repeat the reconditioning mode operation for the second period of time. Therefore, the equalizing mode operation and the reconditioning mode operation will be alternately performed, as shown in FIG. 6. As shown in FIG.

2, the detection of the battery voltage and comparison of the battery voltage with the reference voltage value only occur during the repeated equalizing mode operation.

If the MCU U3 determines that the battery voltage is not higher than the reference voltage value during the repeated the equalizing mode operation, it will stop the equalizing mode operation immediately, and commands the present apparatus to operate in the above-mentioned reconditioning mode for a predetermined third period of time, for example, 10-72 hours or more, which could recondition the battery finally. Then, the whole procedure for rejuvenating the battery is ended. On the other hand, if the battery is in a very serious poor condition, the battery voltage may be still higher than the reference voltage value even after the equalizing mode operation and the reconditioning mode operation are alternately performed for many times. Then, the procedure will be ended when the total period of time reaches a preset time limit, for example, 168 hours or more. The waveform of the current applied on the battery during the whole procedure is shown in FIG. 6.

The lead sulphate crystals or insulating points or layers on the electrical plates will be hit and dissolved gradually by the high instantaneous rising pulse current. Meanwhile, the alternation of the equalizing mode operation and the reconditioning mode operation will make the sulphated crystals to drop from the electrical plates and to be well-distributed in the electrolyte fluid gradually, that is, the operations in equalizing mode and reconditioning mode will enhance the rejuvenating results by each other, which may fully restore the lead sulphate in the electrolyte.

Figure 7:
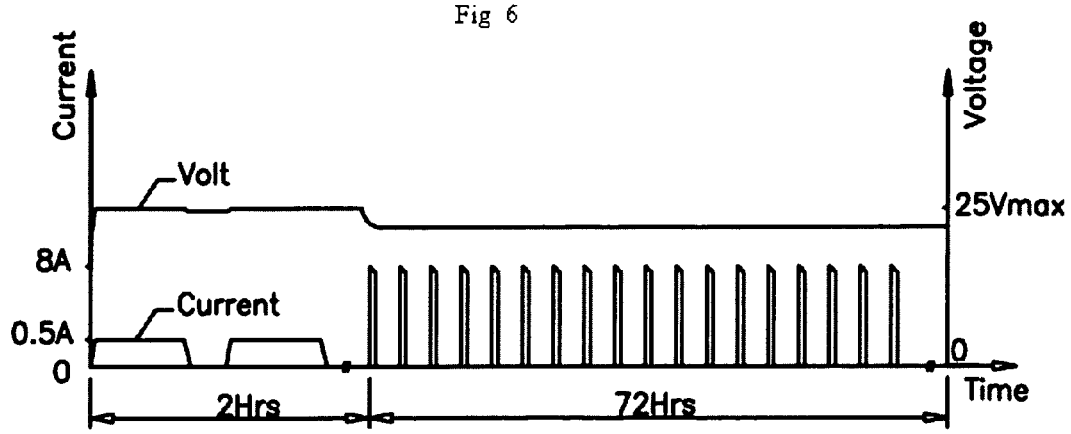
FIG. 7 is a schematic view illustrating the waveform for alternating the equalizing mode and the reconditioning mode, in which the battery is in a good condition.

If the MCU U3 determines that the voltage of the battery is not higher than the reference voltage value immediately after the battery is pre-charged, which means that the battery is in good condition, the MCU U3 will control the present apparatus to operate in the equalizing mode for the above first period of time, and then control the present apparatus to immediately operate in the above-mentioned reconditioning mode for the above third period of time. The waveform of the current applied on the battery during the whole procedure is shown in FIG. 7.

The present battery rejuvenation apparatus may further comprise a temperature detector (not shown in the figures) for detecting the temperature of the battery during the course of the operation of the present apparatus. One or more reference temperature values are set in the MCU U3 according to the details of the different battery. The temperature detector may input a signal indicating the temperature of the battery to the MCU U3, to enable the MCU U3 to judge whether the temperature of the battery is higher than the reference temperature values.

For example, if the MCU U3 determines that the battery temperature is not higher than the reference temperature value, the MCU U3 will control the present apparatus to operate according to the procedure shown in FIG. 2. However, if the battery temperature is higher than the reference temperature value, the MCU U3 will control the present apparatus to immediately operate in the above-mentioned reconditioning mode for the above third predetermined period to avoid damaging the battery.

As those of skill in this art will appreciate, many modifications, substitutions and variations can be made in the materials, units and configurations of the present invention without departing from its spirit and scope. In light of this, the scope of the present invention should not be limited to that of the particular embodiments illustrated and described herein, as they are only exemplary in nature, but instead, should be fully commensurate with that of the claims appended hereafter and their functional equivalents.

What is claimed is:

1. A battery rejuvenation method for rejuvenating a battery, comprising the following steps:
    (a) pre-charging the battery for a short period of time;
    (b) detecting the battery voltage and judging whether the battery voltage is higher than a reference voltage value;
    (c) equalizing the battery with an equalizing voltage based on an equalizing current for a first period of time if it determines that the battery voltage is higher than the reference voltage value in the step (b);
    (d) reconditioning the battery with a high instantaneous rising pulse current of high peak to peak amplitude and short pulse rising time for a second period of time;
    (e) equalizing the battery with the equalizing voltage based on the equalizing current, detecting the battery voltage and judging whether the battery voltage is higher than a reference voltage value;
    (f) maintaining the step (e) for a total period of time equal to the first period of time and then repeat the step (d) if it determines that the battery voltage is higher than the reference voltage value during the step (e), or stopping the step (e) immediately and proceeding to the next step whenever it determines that the battery voltage is not higher than the reference voltage value in step (e);
    (g) reconditioning the battery with the high instantaneous rising pulse current for a third period of time.

2. The battery rejuvenation method according to claim 1, wherein the step (c) is:
    equalizing the battery with an equalizing voltage based on an equalizing current for a first period of time and then proceeding to the step (g) directly if it determines that the battery voltage is not higher than the reference voltage value in the step (b).

3. The battery rejuvenation method according to claim 1, further comprising the steps:
    detecting the temperature of the battery and judging whether the temperature is higher than a reference temperature value during the course of equalizing the battery.

4. The battery rejuvenation method according to claim 3, further comprising the step:
    proceeding to the step (g) immediately if it determines that the temperature of the battery is higher than the reference temperature value.

5. The battery rejuvenation method according to claim 1, wherein the equalizing voltage and the equalizing current are intermittently applied on the battery.

6. The battery rejuvenation method according to claim 1, further comprising terminating the whole procedure if the period of time for performing the procedure reaches a preset time limit.

7. The battery rejuvenation method according to claim 1, wherein the peak to peak amplitude of the instantaneous rising pulse current is 8.0 A and the pulse rising time is 10 µs.

8. The battery rejuvenation method according to claim 6, wherein the short period of time is 5 minutes, the first and second period of time are 2 hours respectively, while the third period of time is 10-72 hours or more, and the time limit is 168 hours or more.

9. A battery rejuvenation apparatus for rejuvenating a battery, comprising:
    a pulse width modification controller which is used to generate a first pulse train signal and is connected to a first switching module to control the operation of the first switching module with the first pulse train signal;

a transformer having a primary winding and a secondary winding, in which the primary winding is connected to a main power source and to the ground through the first switching module;

a rectifier-filter module connected to the secondary winding of the transformer;

a first and second terminals connected to positive and negative terminals of the battery respectively, in which the second terminal is connected directly to the rectifier-filter module;

a second switching module connecting the rectifier-filter module to the first terminal;

a third switching module connected in parallel with the second switching module for connecting the rectifier-filter module to the first terminal;

a microcontroller unit for turning on the second switching module and the third switching module alternatively, in which when the second switching module is turned on, the rectifier-filter module charges or equalizes the battery, and when the third switching module is turned on, the rectifier-filter module reconditions the battery with a high instantaneous rising pulse current of high peak to peak amplitude and short pulse rising time.

10. The battery rejuvenation apparatus according to claim 9, wherein the first switching module is a MOSFET having a gate, a drain and a source, in which the gate of the MOSFET is connected to the pulse width modification controller to receive the first pulse train signal, while the drain and the source thereof are connected to the primary winding of the transformer and the ground respectively through a current limiting resistor.

11. The battery rejuvenation apparatus according to claim 9, wherein the second switching module comprises a relay coil, a normally open relay switch, a relay coil power source and a first transistor having a base, a collector and an emitter, in which the relay coil is connected to the relay coil power source and to the collector of the first transistor, the base and the emitter of the first transistor are connected to the microcontroller unit and the ground respectively, the normally open relay switch is connected between the rectifier-filter module and the second terminal, and the second switching module is turned on when the microcontroller unit sends a signal of high level to the base of the first transistor.

12. The battery rejuvenation apparatus according to claim 9, further comprising a feedback module for sending a feedback signal to the pulse width modification controller to enable the pulse width modification controller to modify the working time in the first pulse train signal.

13. The battery rejuvenation apparatus according to claim 12, wherein the feedback module comprises:

a photo-coupler having a light emitting diode and an optical receiver transistor; and a second transistor having a base, a collector and an emitter, in which the base of the second transistor is connected to the microcontroller unit for receiving a signal from the microcontroller unit during the operation of the second switching module, and the emitter of the second transistor is connected to the ground, and the collector of the second transistor is connected to the cathode of light emitting diode the anode of which is connected to the output end of the the rectifier-filter module through a resistor, and the light receiver transistor having an emitter connected to the ground and a collector connected to the pulse width modification controller for inputting the feedback signal thereto.

14. The battery rejuvenation apparatus according to claim 12, wherein the feedback module further comprises a zener diode connected in parallel with the second transistor.

15. The battery rejuvenation apparatus according to claim 9, wherein the third switching module comprises third and fourth transistors, a diode, and first, second and third resistors, in which the third transistor comprises an emitter connected to the rectifier-filter module, a collector connected to the first terminal through the diode, and a base connected through the first resistor to the rectifier-filter module and through the second resistor, the fourth transistor and the third resistor to the microcontroller unit, the fourth transistor comprises an emitter connected to the ground, a collector connected to the second resistor and a base connected to the microcontroller unit through the third resistor to received a second pulse train signal from the microcontroller unit.

16. The battery rejuvenation apparatus according to claim 9, further comprising a detecting circuit for detecting the voltage of the battery and a temperature detector for detecting the temperature of the battery.

* * * * *